United States Patent Office 3,391,126
Patented July 2, 1968

3,391,126
POLYMERIZATION OF PARA-DIOXANONE
AND DERIVATIVES
Joseph M. Baggett, Freeport, Jack W. Horvath, Angleton, and Billy W. Wilson, Lake Jackson, Tex., assignors to The Dow Chemical Company, Midland, Mich., a corporation of Delaware
No Drawing. Filed May 8, 1964, Ser. No. 366,156
14 Claims. (Cl. 260—78.3)

ABSTRACT OF THE DISCLOSURE

Orientable solid polymers of 2-p-dioxanones are produced by polymerizing the monomer in the presence of an iron, titanium or zirconium chelate of a 1,3-diketone.

This invention relates to the catalytic polymerization of para-dioxanone compounds. More particularly, the present invention relates to the polymerization of 2-para-dioxanone compounds in the presence of a metal chelate catalyst.

It is known that organometallic compounds (including metal hyrides and compounds which contain a carbon-metal bond) are active catalysts for the polymerization of 2-para-dioxanone. Numerous such organometallic catalysts are disclosed, for example, in U.S. Patents 3,021,309–3,021,317 to Cox et al. and U.S. 3,063,967–3,063,968 to Schultz. However, the molecular weights of the polymers produced when such catalyst systems are used have been found to vary widely. Thus, it often occurs that these polymeric products are of such low molecular weight that they exist only as thin or viscous liquids totally unsuitable for fiber formation, or else the final polymeric products have such a wide molecular weight distribution that it is necessary to use costly separation techniques in order to obtain polymers suitable for the formation of synthetic fibers.

It has now been found that metal chelates formed by the reaction of compounds of iron, zirconium titanium (especially salts) with 1,3-diketones may be used as catalysts to polymerize 2-para-dioxanone and its alkyl-substituted derivatives. Moreover, the molecular weight distribution and structure of these products make them very suitable for the manufacutre of highly oriented films and fibers.

The compounds which are polymerized according to the present invention are lactones characterized by the formula

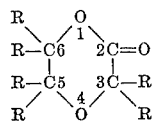

wherein each R is a hydrogen atom or an alkyl group of from 1 to 2 carbon atoms (e.g., methyl and ethyl). Suitable R groups are those of the formula $+(C_kH_{2k})H$ wherein $k$ is an integer of from 0 to 2. Examples of such compounds include 2-p-dioxanone (1,4-dioxan-2-one), 3,5 - dimethyl - 1,4 - dioxan-2-one, 3-methyl-6-ethyl-1,4-dioxan-2-one, 3,5,6-trimethyl-1,4-dioxan - 2 - one and 6-methyl-1,4-dioxan-2-one.

The chelate catalysts of the invention are characterized by the presence of at least one enolate group (derived from a β-diketone) which is covalently bonded to the metal. Suitable 1,3-diketones (which may also exist in the enol form or as equilibrium mixtures of keto and enol forms) are presented by the formula

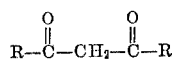

wherein each R is an aryl group of from 6 to 10 carbon atoms (such as phenyl, duryl, phenethyl, benzyl, tolyl or naphthyl) or a lower alkyl group of from 1 to 4 carbon atoms (such as methyl, ethyl, n-propyl, i-propyl, n-butyl, sec.-butyl, i-butyl or tert.-butyl).

The chelate complexes useful as catalysts according to the present invention thus contain a central metal atom or ion (Fe, Ti, Zr and/or ions derived therefrom) surrounded by a cluster of ions or molecules (ligands or co-ordinating groups) derived from β-diketones such as 2,4-pentanedione (acetylacetone), 1-phenyl-1,3-butanedione, 1,3-diphenyl-1,3-propanedione, 1,3-dibenzyl-1,3-propanedione, 1-(p-tolyl)-1,3-butanedione, 2,4-heptanedione, 3,5-octanedione, 1-(i-butyl)-1,3-butanedione, etc., or derived from acetoacetic esters such as methylacetoacetate or ethyl acetoacetate, etc.

The formation of a typical chelate complex is illustrated by the following reactions:

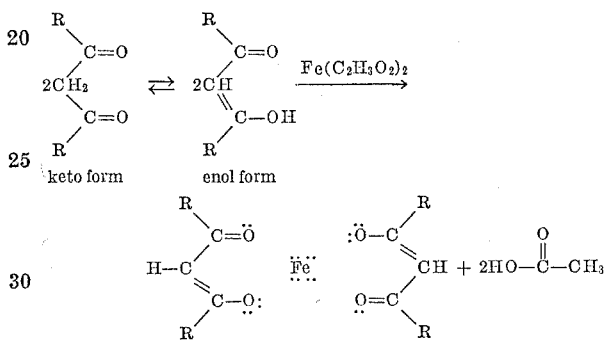

Similar complexes are formed with titanium and zirconium with one enolate group

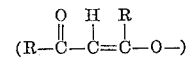

coordinated to the metal atom for each valence of the metal (i.e., Zr (IV) chelate complexes contain 4 such groups). The chelate complexes can thus be represented by the general formula

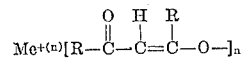

wherein each R is an aryl group of from 6 to 10 carbon atoms or a lower alkyl group of from 1 to 4 carbon atoms as previously defined, $n$ is an integer of from 2 to 4 which represents the valence of the metal moiety Me, and Me represents an iron, zirconium or titanium atom or ion (e.g., Fe(II), Fe(III), Ti(III), Ti(IV), Zr(III) and Zr (IV) ).

Only a catalytic amount of chelate complex is required for the polymerization. Ordinarily, from 0.1 to 5.0 parts of chelate complex per 100 parts by weight of 2-para-dioxanone compound is sufficient. The weight ratio of catalyst to 2-para-dioxanone compound is preferably from about 0.25:100 to 2.5:100. The polymerization may be carried out at temperatures of from about 35 degrees C. to 105 degrees C.; the most suitable polymerization temperatures are from about 60 to 90 degrees C. The polymerization is not pressure sensitive and any convenient pressure of from a few millimeters of mercury up to 10 to 20 atmospheres may be used. For economic reasons, autogenous pressure is employed when the polymerization is carried out in a closed vessel. The time necessary for polymerization may vary from about one-half hour to about 3 days at temperatures of from 35 to 105 degrees C.

The following examples are submitted for the purpose of illustration only and are not to be construed as limiting the scope of the invention in any way.

Examples I–IV.—General method

One gram of the metal chelate catalyst was added to a 300 milliliter wire-fastened, glass-stoppered bottle (a "citrate" bottle) which was carefully purged with nitrogen. One hundred grams of 2-para-dioxanone was then added and the bottle capped. The mixture was maintained at 70 degrees C. and constantly agitated until the polymer solidified. The results are summarized in Table 1.

TABLE 1

| Example Number | Catalyst | Result |
| --- | --- | --- |
| I | Zirconium (IV) acetylacetonate, $Zr(C_5H_7O_2)_4$. | Polymerized in 24 hours to a tough polymer that orients to a very strong film. |
| II | Ferric acetylacetonate, $Fe(C_5H_7O_2)_3$. | Polymerized in 48 hours to a tough polymer which orients to form a very strong film. |
| III | Ferrous acetylacetonate, $Fe(C_5H_7O_2)_2$. | Polymerized in 72 hours to a tough polymer that would orient to a very tough film. |
| IV | Titanyl (IV) acetyl-acetonate, $Ti(C_5H_7O_2)_4$. | Polymerized to a solid crystalline polymer, but orientation properties not as good as Examples I–III. |

Comparison with other chelate compounds (such as chromium, vanadium, nickel, aluminum, zinc, copper, cobalt and manganese acetylacetonates) either gave no polymerization, or else formed only low molecular weight syrups.

We claim as our invention:

1. A method of polymerizing 2-para-dioxanone compounds to an orientable polymer which comprises contacting said compounds with a catalytic amount of a chelate complex of a 1,3-diketone and a metal moiety selected from the group consisting of iron, zirconium and titanium.

2. A method of polymerizing to an orientable polymer a compound of the formula (I) 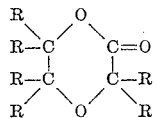

wherein each R is a group of the formula $(C_kH_{2k})H$ in which $k$ is an integer of from 0 to 2, which comprises heating (I) at a temperature of from 35 to 105 degrees C. in the presence of a chelate complex containing a metal moiety selected from the group consisting of iron, zirconium and titanium coordinated to at least one ligand derived from a 1,3-diketone of the formula

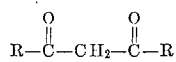

wherein each R is selected from the group consisting of an aryl group of from 6 to 10 carbon atoms and a lower alkyl group of from 1 to 4 carbon atoms.

3. A method of polymerizing 2-para-dioxanone to an orientable polymer which comprises heating said 2-para-dioxanone at a temperature of from 35 to 105 degrees C. in the presence of a catalytic amount of an iron chelate complex in which the coordinating group is an enolate of the formula

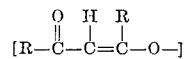

wherein each R is a lower alkyl group of from 1 to 4 carbon atoms.

4. The method of claim 3 wherein the iron chelate complex ferrous acetylacetonate.

5. The method of claim 3 wherein the iron chelate complex is ferric acetylacetonate.

6. A method of polymerizing 2-para-dioxanone to an orientable polymer which comprises heating said 2-para-dioxanone at a temperature of from 35 to 105 degrees C. in the presence of a catalytic amount of a titanium chelate complex in which the coordinating group is an enolate of the formula

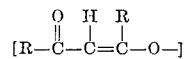

wherein each R is an alkyl group of from 1 to 4 carbon atoms.

7. The method of claim 6 wherein the titanium chelate complex is titanium (IV) acetylacetonate.

8. A method of polymerizing 2-para-dioxanone to an orientable polymer which comprises heating said 2-para-dioxanone at a temperature of from 35 to 105 degrees C. in the presence of a zirconium chelate complex of the formula

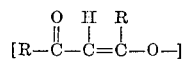

wherein each R is an alkyl group of from 1 to 4 carbon atoms, and n is an integer of from 3 to 4.

9. The method of claim 8 wherein the zirconium chelate complex is zirconium (IV) acetylacetonate.

10. A crystalline polymer produced in accordance with the process of claim 1.

11. A method of polymerizing 2-para-dioxanone which comprises heating said 2-para-dioxanone to an orientable polymer at a temperature of from 35 to 105 degrees C. in the presence of a chelate complex of the formula

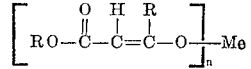

wherein each R is an alkyl group of from 1 to 4 carbon atoms, Me is a metal moiety selected from the group consisting of iron, zirconium and titanium and $n$ is an integer of from 2 to 4 which represents the valence of said metal moiety, Me.

12. The method of claim 11 wherein the chelate complex is iron ethyl acetoacetate.

13. The method of claim 11 wherein the chelate complex is titanium methyl acetoacetate.

14. The method of claim 11 wherein the chelate complex is zirconium ethyl acetoacetate.

References Cited

UNITED STATES PATENTS

| | | | |
| --- | --- | --- | --- |
| 3,063,967 | 11/1962 | Schultz | 260—78.3 |
| 2,878,236 | 3/1959 | Young et al. | 260—78.3 |

WILLIAM H. SHORT, *Primary Examiner.*

R. T. LYON, *Assistant Examiner.*